(12) United States Patent
Xie

(10) Patent No.: US 11,415,180 B2
(45) Date of Patent: Aug. 16, 2022

(54) DEVICE TO ADJUST THE ROTATION OF A CANOPY OF A SUNSHADE

(71) Applicant: Yotrio Group Co., Ltd., Linhai (CN)

(72) Inventor: Jianqiang Xie, Linhai (CN)

(73) Assignee: Yotrio Group Co., LTD., Zhejiang (CN)

( * ) Notice: Subject to any disclaimer, the term of this patent is extended or adjusted under 35 U.S.C. 154(b) by 230 days.

(21) Appl. No.: 16/888,733

(22) Filed: May 31, 2020

(65) Prior Publication Data

US 2021/0079956 A1 Mar. 18, 2021

(51) Int. Cl.
| | |
|---|---|
| *F16D 11/10* | (2006.01) |
| *A45B 23/00* | (2006.01) |
| *A45B 25/00* | (2006.01) |
| *A45B 17/00* | (2006.01) |

(52) U.S. Cl.
CPC ............. *F16D 11/10* (2013.01); *A45B 23/00* (2013.01); *A45B 25/00* (2013.01); *A45B 17/00* (2013.01); *A45B 2023/0012* (2013.01)

(58) Field of Classification Search
CPC .......... F16D 11/10; F16D 11/14; A45B 23/00; A45B 25/00; A45B 2023/0012
See application file for complete search history.

(56) References Cited

U.S. PATENT DOCUMENTS

| | | | |
|---|---|---|---|
| 6,575,183 B2* | 6/2003 | Tung ...................... | A45B 17/00 135/98 |
| 7,412,985 B2* | 8/2008 | Ma ......................... | A45B 17/00 242/395 |
| 2021/0079956 A1* | 3/2021 | Xie ......................... | A45B 25/00 |

\* cited by examiner

*Primary Examiner* — Stacey A Fluhart
(74) *Attorney, Agent, or Firm* — Jingming James Cai; SAC Attorneys LLP

(57) ABSTRACT

A device to adjust the angle of rotation of a canopy of a sunshade comprises an upper clutch sleeve sleeved at a lower end of an upper tube of the sunshade, a lower clutch sleeve sleeved at an upper end of a lower tube, a rotary handle sleeve and a rotary shaft sleeved outside the upper tube and the lower tube, a rotary shaft rotationally inserted within one of the upper tube and the lower tube and fixedly connected with the other, a retaining ring disposed between the upper end of the rotary handle sleeve and the upper tube and elastically connected with the upper clutch sleeve or the upper tube, and a set of fitting parts.

7 Claims, 6 Drawing Sheets

Umbrella Sunshade

DEVICE TO ADJUST THE ROTATION OF A CANOPY OF A SUNSHADE

CROSS REFERENCE TO RELATED APPLICATIONS

This application claims priority to and benefit of the utility model patent application number 201921522557.6 titled "A Device To Adjust The Rotation Of Sunshade", filed on Sep. 12, 2019 in the National Intellectual Property Administration of the People's Republic of China. The specifications of the above referenced patent application is incorporated herein by reference in its entirety.

FIELD OF THE INVENTION

The present invention, in general, relates to outdoor products, and more particularly, relates to a device to adjust rotation of a canopy of a sunshade.

BACKGROUND

As the sun rises in the east and sets in the west, the angle of sunlight will change. In response to the change in angle of sunlight, sunshades are equipped with a built-in bending device to adjust the inclination angle of canopy of the sunshades.

The Chinese patent application No. CN200420023521.0 (Prior Art FIG. 7) discloses a rotating device for adjusting the angle of rotation of an umbrella sunshade with a canopy to provide an inclination adjustment device (not claimed). The rotating device comprises a bearing seat and a shaft sleeve which are respectively fixed between two sunshade tubes. A bearing is disposed in the bearing seat and a coupling shaft connecting the bearing seat and the shaft sleeve passes through the bearing seat. The bearing is fixed into the shaft sleeve, while the coupling shaft is in dynamic coordination with the bearing seat and the bearing. The lower tube is detachably connected to a knob through a clutch mechanism and the upper tube is rotationally connected with the knob through a connection mechanism. By rotating the knob, the umbrella surface can be rotated. The disadvantage of the rotating device in prior art CN200420023521.0 is that the rotating device has a complicated structure and is inconvenient to assemble. Furthermore, the clutch mechanism in the knob gets stuck in case of slight deformation, and then as a consequence, the knob fails to disengage from the clutch ring.

SUMMARY OF THE INVENTION

The present invention addresses the shortcomings of prior art rotating devices by providing a rotation device for adjusting the angle of rotation of a canopy of a sunshade that is designed for a smooth and convenient disengagement of a rotary handle sleeve and a lower clutch sleeve, optimization and simplification of structure, reduction in number of parts, ease of assembly, and a reduction in cost. The overall structure of the sunshade is similar to the structure in FIG. 7. The difference lies in the rotation device, which is illustrated in the following paragraphs.

The rotation device comprises an upper clutch sleeve sleeved at a lower end of an upper tube, a lower clutch sleeve sleeved at an upper end of a lower tube, a rotary handle sleeve, and a rotary shaft sleeved outside the upper tube and the lower tube. The rotary shaft is rotationally inserted into one of the upper tube and the lower tube, and is fixedly connected to the other. A retaining ring is disposed between an upper end of the rotary handle sleeve and the upper tube, and the retaining ring is elastically connected to the upper clutch sleeve or the upper tube. The upper clutch sleeve is provided with a fitting part of the upper clutch sleeve, and the lower clutch sleeve is provided with a fitting part of the lower clutch sleeve. The inner wall of the rotary handle sleeve is provided with an upper fitting part of the rotary handle sleeve which is slidably connected with the fitting part of the upper clutch sleeve and a lower fitting part of the rotary handle sleeve which is embedded within the fitting part of the lower clutch sleeve.

An upper fixing sleeve is disposed between the rotary shaft and the upper tube. The upper fixing sleeve is fixedly connected with one of the rotary shaft and the upper tube, and is rotationally connected with the other.

Furthermore, the upper fixing sleeve is fixedly connected with the upper clutch sleeve and a set of shaft sleeves is disposed between the upper fixing sleeve and the rotary shaft.

Furthermore, an upper shaft sleeve is disposed between the upper fixing sleeve and the upper end of the rotary shaft, and a lower shaft sleeve is disposed between the upper fixing sleeve and the lower end of the rotary shaft.

Furthermore, the lower part of the rotary shaft is inserted into the lower tube and is fixedly connected with a lower fixing sleeve.

Furthermore, the fitting part of the upper clutch sleeve is a set of guide ribs which are arranged on an outer wall of the upper clutch sleeve, and the upper fitting part of the rotary handle sleeve is a set of guide grooves which are arranged on the inner wall of the rotary handle sleeve, and the guide ribs and the guide grooves are slidably connected.

Furthermore, the fitting part of the lower clutch sleeve is a clutch gear of the lower clutch sleeve and the lower fitting part of the rotary handle sleeve is a clutch gear of the rotary handle sleeve which can engage with the clutch gear of the lower clutch sleeve.

Furthermore, a tooth surface of the clutch gear of the lower clutch sleeve is opposite to the tooth surface of the clutch gear of the rotary handle sleeve in an up-down arrangement. The tooth surface of the clutch gear of the lower clutch sleeve is on top or the tooth surface of the clutch gear of the rotary handle sleeve is on top while the other is at bottom in the up-down arrangement.

Furthermore, the clutch gear of the lower clutch sleeve and the clutch gear of the rotary handle sleeve comprise inclined surfaces.

Furthermore, a reset spring is disposed between the retaining ring and the upper clutch sleeve.

Disclosed herein is a device to adjust the rotation of a canopy of a sunshade that ensures the smooth and convenient disengagement of the rotary handle sleeve and the lower clutch sleeve, and optimizes the structure, reduces the number of parts, simplifies the structure, improves assembly and cuts down the cost of a device to adjust the rotation of a canopy of a sunshade.

PARTS OF A ROTATION DEVICE OF FIG. 1

Figure 1:
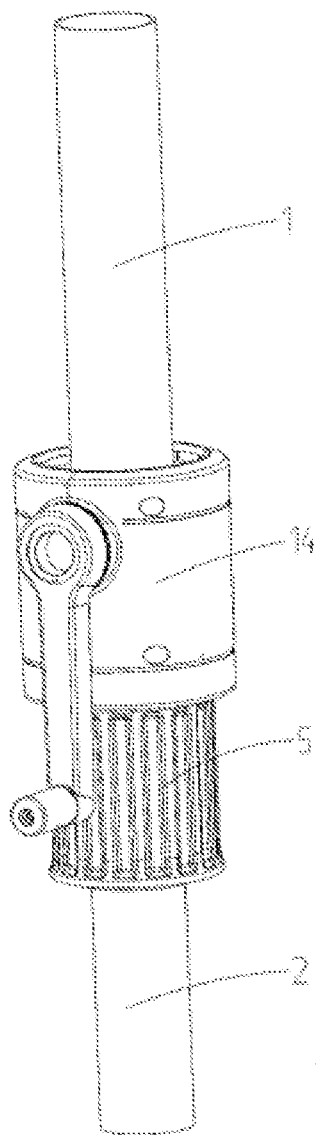
FIG. 1 is a structural diagram of a rotation device to adjust an angle of rotation of a canopy of a sunshade.
Figure 2:
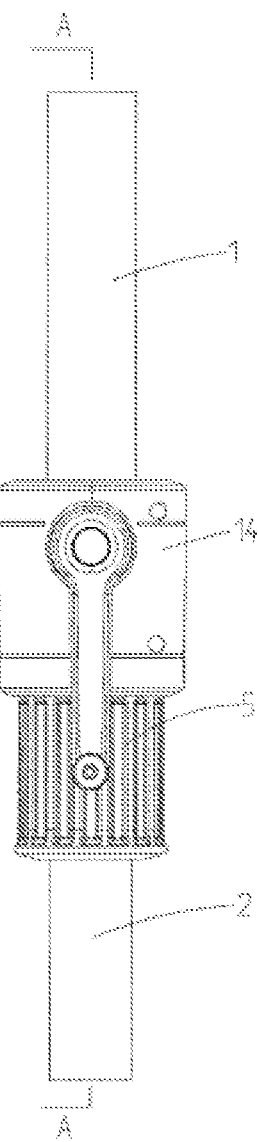
FIG. 2 is a sectional view of a structural diagram of a rotation device to adjust an angle of rotation of a canopy of a sunshade.

Upper tube 1;
Lower tube 2;
Upper clutch sleeve 3;
Guide rib 300;
Lower clutch sleeve 4;
Clutch gear 400 of the lower clutch sleeve 4;
Rotary handle sleeve 5;
Guide groove 500;
Clutch gear 501 of the rotary handle sleeve 5;
Collar flange 502 of the rotary handle sleeve 5;
Rotary shaft 6;
Retaining ring 7;
Upper fixing sleeve 8;
Upper shaft sleeve 9;
Collar flange of the upper shaft sleeve 9;
Lower shaft sleeve 10;
Collar flange 1000 of the lower shaft sleeve 10;
Lower fixing sleeve 11;
Reset spring 12;
Snap ring 13;
Manual mechanism 14.

DETAILED DESCRIPTION OF THE INVENTION

The present invention will be further described in combination with the attached drawings.

As illustrated in FIGS. 1-6, the present invention discloses a rotation device to adjust the angle of rotation of a canopy of a sunshade, comprising an upper clutch sleeve 3 sleeved on an outer wall of a lower end of an upper tube 1, a lower clutch sleeve 4 sleeved on the outer wall of the upper end of a lower tube 2, a rotary handle sleeve 5, and a rotary shaft 6 sleeved on the upper tube 1 and the lower tube 2. The rotary shaft 6 rotates a connecting piece between the upper tube 1 and the lower tube 2. One end of the rotary shaft 6 is rotationally inserted into the upper tube 1 and the other end of the rotary shaft 6 is fixedly connected to the lower tube 2. A retaining ring 7 is disposed between the upper end of the rotary handle sleeve 5 and the upper tube 1. The retaining ring 7 is elastically connected to the upper clutch sleeve 3 or the upper tube 1. The upper clutch sleeve 3 is disposed with a fitting part of the upper clutch sleeve 3. The lower clutch sleeve 4 is disposed with a fitting part of the lower clutch sleeve 4. The inner wall of the rotary handle sleeve 5 is provided with an upper fitting part, which is slidably connected to the fitting part of the upper clutch sleeve 3. The inner wall of the rotary handle sleeve 5 is also provided with a lower fitting part, which can be embedded with the fitting part of the lower clutch sleeve 4.

The optimized structure of the present invention further comprises an upper fixing sleeve 8 disposed between the upper tube 1 and the rotary shaft 6. The upper fixing sleeve 8 is fixedly connected with one of the upper tube 2 and the rotary shaft 6 and is rotationally connected with the other. In an embodiment, a periphery of the upper fixing sleeve 8 is fixedly connected through screws to one of a periphery of the upper clutch sleeve 3 and the upper tube 1. An upper shaft sleeve 9 is disposed between the upper fixing sleeve 8 and an upper end of the upper tube 1. A lower shaft sleeve 10 is disposed between the upper fixing sleeve 8 and the lower end of the upper shaft sleeve 9. The upper end of the upper shaft sleeve 9 extends outwards to form a collar flange 900 of the upper shaft sleeve 9. The collar flange 900 of the upper shaft sleeve 9 is clamped between a top of the upper fixing sleeve 8 and a snap ring 13 of the rotary shaft 6. The lower end of the lower shaft sleeve 10 extends outwards to form a collar flange 1000 of the lower shaft sleeve 10. The collar flange 1000 of the lower shaft sleeve 10 is clamped between a bottom of the upper fixing sleeve 8 and a top of a lower fixing sleeve 11. The lower fixing sleeve 11 is disposed between the rotary shaft 6 and the lower tube 2. A periphery of the lower tube 2, the lower fixing sleeve 11 and the rotary shaft 6 are all fixedly connected through screws. The top of the lower fixing sleeve 11 extends outwards to the top of the lower clutch sleeve 4. The upper shaft sleeve 9 and the lower shaft sleeve 10 are copper shaft sleeves, the upper fixing sleeve 8 is a copper sleeve and the lower fixing sleeve 11 is a rubber sleeve.

The fitting part of the upper clutch sleeve 3 is a set of vertical guide ribs 300 disposed at an outer wall of the upper clutch sleeve 3. In an embodiment, the number of vertical guide ribs 300 is four. The upper fitting part of the rotary handle sleeve 5 is a set of guide grooves 500 disposed on two inner walls of the rotary handle sleeve 5. The two inner walls of the rotary handle sleeve 5 are disposed with several sets of convex blocks, and the gap between two convex blocks forms the guide groove 500. Each guide rib 300 corresponds to a guide groove 500 and slideably engages with the guide groove 500.

The fitting part of the lower clutch sleeve 4 is a clutch gear 400, the tooth surface of which is disposed downward. The lower fitting part of the rotary handle sleeve 5 is a clutch gear 501, the tooth surface of which is disposed upward. The clutch gear 501 of the rotary handle sleeve 5 engages up and down with the clutch gear 400 of the lower clutch sleeve 4. A block teeth in the clutch gear 400 of the lower clutch sleeve 4 and the clutch gear 501 of the rotary handle sleeve 5 are of a ladder structure with inclined surfaces on both sides. When engaging, convenient engagement can be achieved even if any part is slightly deformed. The size and number of the block teeth can be adjusted according to user needs.

A reset spring 12 is disposed between the retaining ring 7 and the upper clutch sleeve 3. The reset spring 12 is a compression spring and sleeved outside the upper tube 1. The retaining ring 7 is elastically connected with the upper clutch sleeve 3 through the reset spring 12.

The upper end of the rotary handle sleeve 5 is disposed with a collar flange 502, which is used for blocking a bottom of a housing of a manual mechanism 14 on the upper tube 1 to prevent the collar flange 502 of the rotary handle sleeve 5 from falling off from the lower end of the manual mechanism 14. The outer wall of the rotary handle sleeve 5 is provided with an anti-slip part for manual rotation. The manual mechanism 14 is a conventional structure for tilting and rotating the sunshade.

Figure 3:
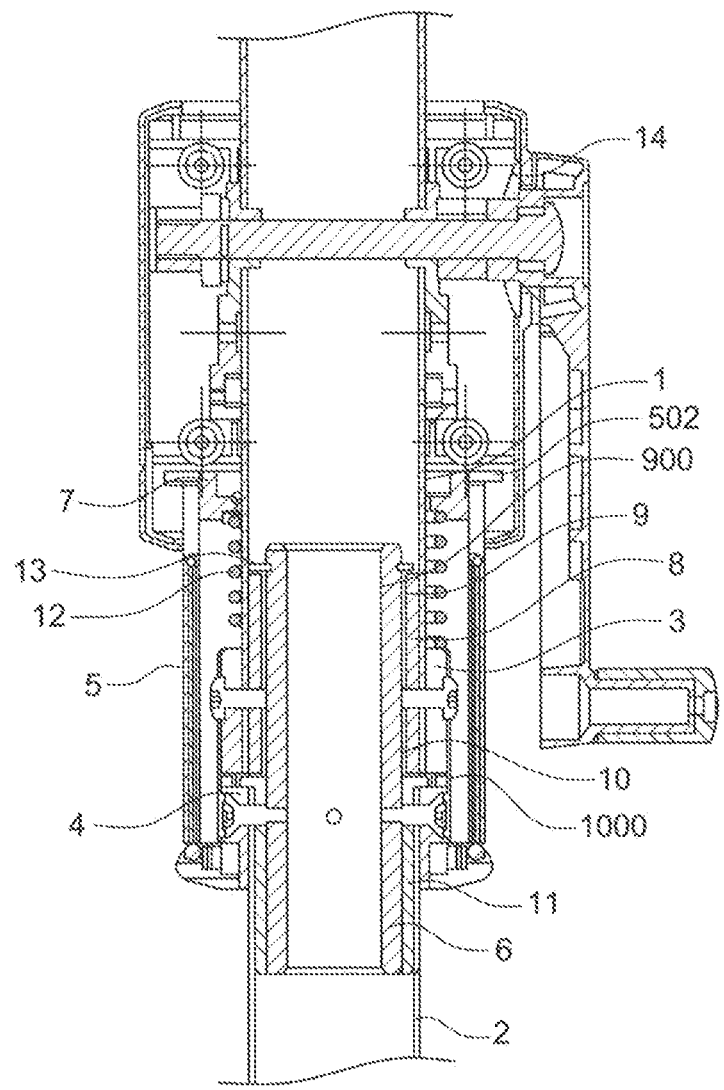
FIG. 3 is a partial schematic diagram of A-A sectional view of FIG. 2.
Figure 4:
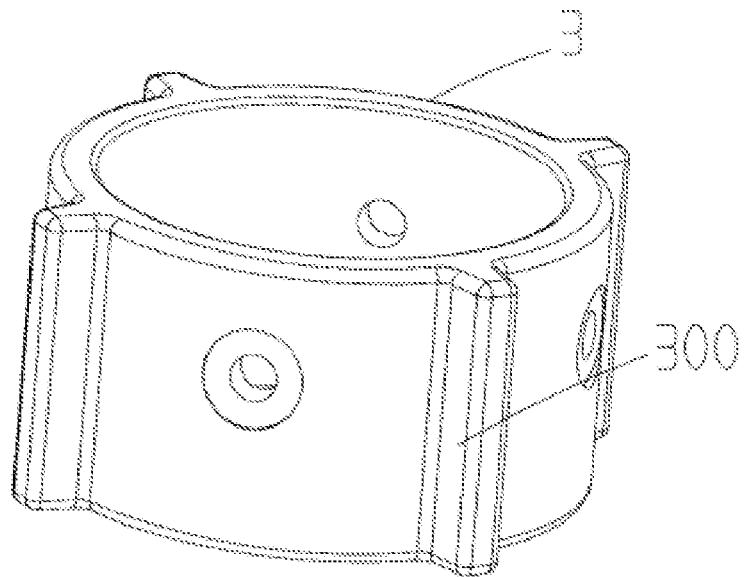
FIG. 4 is a structural diagram of an upper clutch sleeve of a rotation of FIG. 1.
Figure 5:
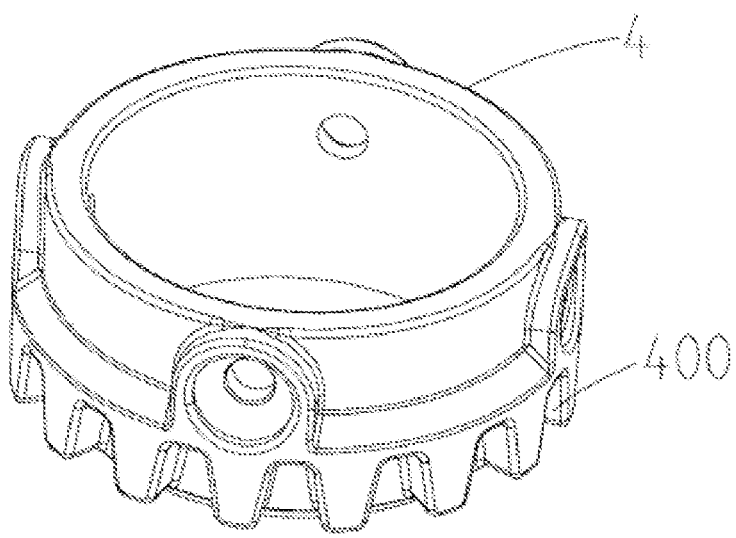
FIG. 5 is a structural diagram of a lower clutch sleeve of a rotation of FIG. 1.
Figure 6:
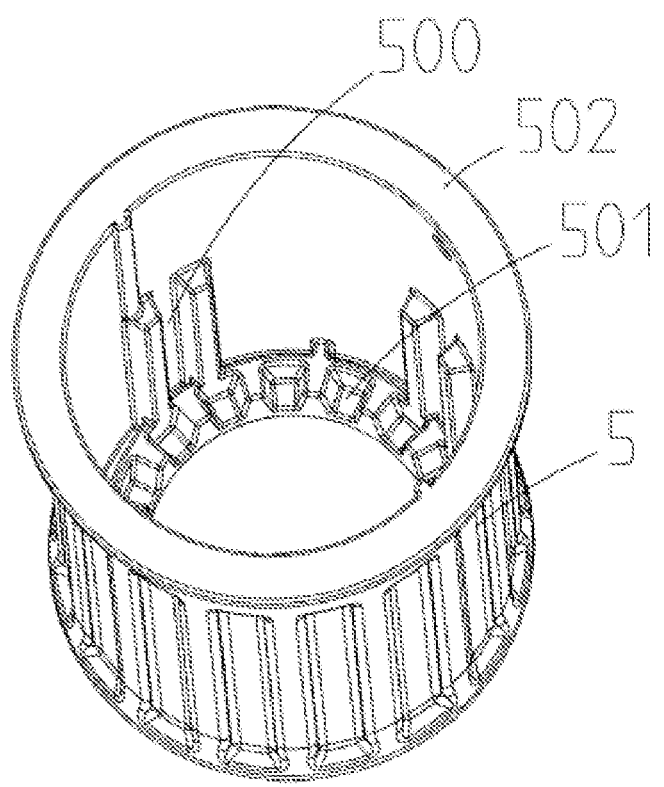
FIG. 6 is a structural diagram of a rotary handle sleeve of a rotation of FIG. 1.
Figure 7:
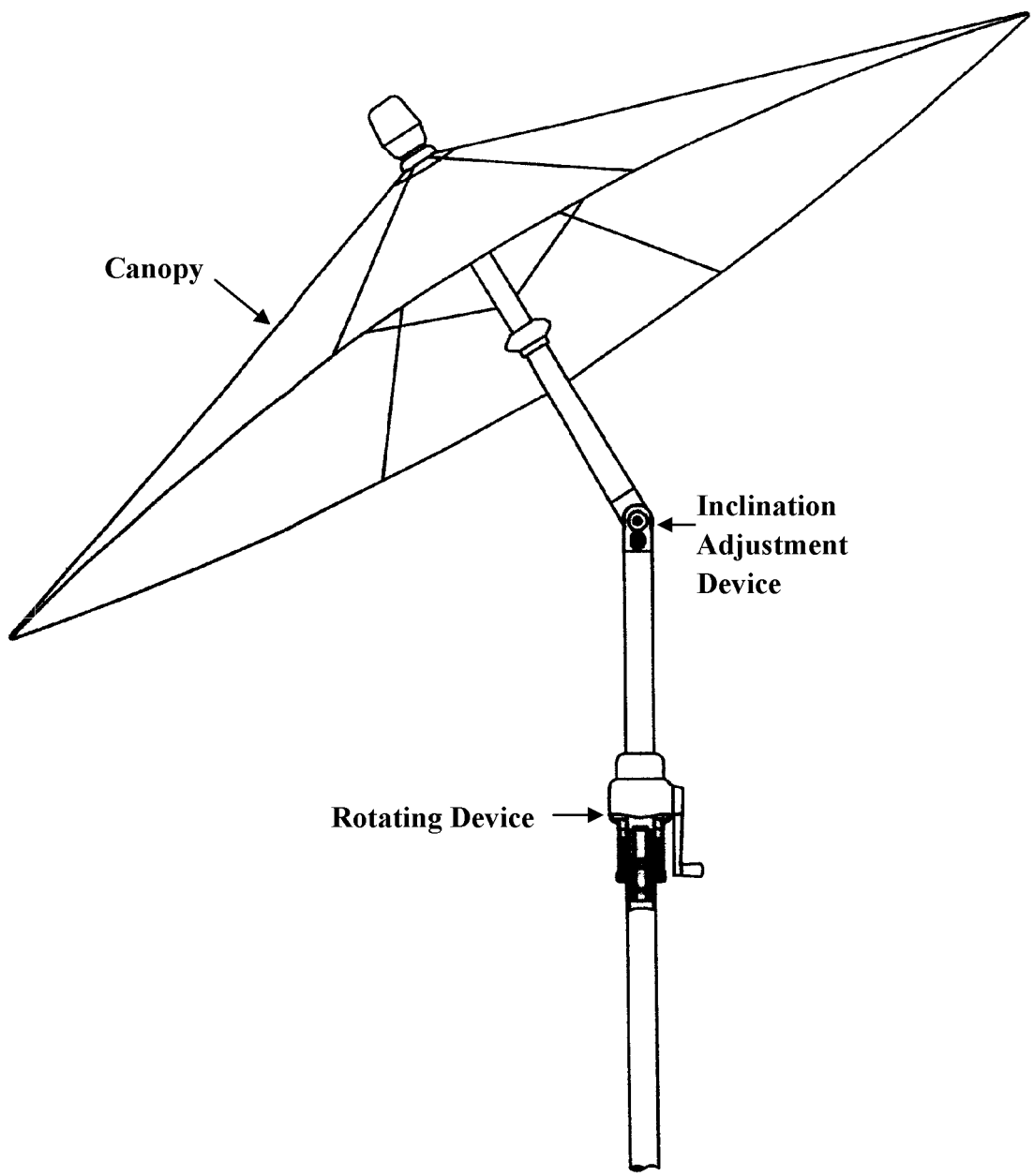
FIG. 7 illustrates a prior art rotating device for adjusting an angle of rotation of an umbrella sunshade comprising a canopy, where the rotating device provides an inclination adjustment device.

Under normal conditions, the rotary handle sleeve 5 is kept in position as shown in FIG. 3 under the action of the reset spring 12. At this condition, the clutch gear of the rotary handle sleeve 5 is engaged with the clutch gear of the lower clutch sleeve 4, so that the rotary handle sleeve 5 cannot rotate against the lower tube 2. To adjust the rotation angle of the sunshade, the rotary handle sleeve 5 is manually move down to separate the clutch gear 501 of the rotary handle sleeve 5 from the clutch gear 400 of the lower clutch sleeve 4, and then the rotary handle sleeve 5 is rotated to make the guide groove 500 of the rotary handle sleeve 5 fit the guide rib 300 of the upper clutch sleeve 3, so that the rotary handle sleeve 5 drives the upper clutch sleeve 3 to rotate and the upper clutch sleeve 3 drives the upper tube 1 to rotate. As a result, the surface of the canopy of the sunshade is rotated.

In another embodiment the reset spring 12 of the present innovation is a tension spring. The tooth surface of the clutch gear 400 of the lower clutch sleeve 4 and the clutch gear 501 of the rotary handle sleeve 5 are disposed upwards and downwards respectively. Under normal condition, the tension spring 12 compresses the rotary handle sleeve 5 downwards, so that the clutch gear 501 of the rotary handle sleeve 5 and the clutch gear 400 of the lower clutch sleeve 4 are always engaged, and the rotary handle sleeve 5 cannot rotate against the lower tube 2. To adjust the rotation angle of the canopy of the sunshade, the rotary handle sleeve 5 is manually moved up to separate the clutch gear 501 of the rotary handle sleeve 5 from the clutch gear 400 of the lower clutch sleeve 4, and then the rotary handle sleeve 5 is rotated to make the guide groove 500 of the rotary handle sleeve 5 fit the guide rib 300 of the upper clutch sleeve 3, so that the rotary handle sleeve 5 drives the upper clutch sleeve 3 to rotate and the upper clutch sleeve 3 drives the upper tube 1 to rotate and as a result, the canopy of the sunshade is rotated.

It should be noted that the above embodiments are only used to describe the technical scheme of the present invention, but not to limit it. Despite detailed descriptions through references of various embodiments above, technicians in this field shall understand that he/she can still modify the technical schemes or replace part or all of the technical scheme. These modifications or replacements do not deviate the essence of the corresponding technical scheme from the scope of the technical schemes of the embodiments of the present invention.

I claim:

1. A rotation device to adjust an angle of rotation of a canopy of a sunshade, comprising:
   an upper clutch sleeve (3) sleeved at a lower end of an upper tube (1) of the sunshade;
   a lower clutch sleeve (4) sleeved at an upper end of a lower tube (2) of the sunshade;
   a rotary handle sleeve (5) connected to said upper clutch sleeve and said lower clutch sleeve;
   a rotary shaft (6), wherein said rotary shaft (6) is rotationally inserted within one of the upper tube (1) and the lower tube (2) of the sunshade and fixedly connected with the other;
   a retaining ring (7) disposed between an upper end of the rotary handle sleeve (5) and the upper tube (1) of the sunshade;
   said retaining ring (7) elastically connected to one of the upper clutch sleeve (4) and the upper tube (1) of the sunshade;
   said upper clutch sleeve (3) comprising a set of guide ribs (300) disposed on an outer wall of the upper clutch sleeve (3);
   said rotary handle sleeve (5) comprising a set of guide grooves (500) disposed on an inner wall of the rotary handle sleeve (5);
   said guide ribs (300) slideably connected to said guide grooves (500);
   said lower clutch sleeve (4) comprising a clutch gear (400);
   said rotary handle sleeve (5) comprising a clutch gear (501), wherein said clutch gear (501) of the rotary handle sleeve (5) engages the clutch gear (400) of the lower clutch sleeve (3); and
   a tooth surface of the clutch gear (400) of the lower clutch sleeve (4) is opposite to a tooth surface of the clutch gear (501) of the rotary handle sleeve (5) in an up-down arrangement, wherein one of said tooth surface of the clutch gear (400) of the lower clutch sleeve (4) and the tooth surface of the clutch gear (501) of the rotary handle sleeve is on top while other is at a bottom in said up-down arrangement.

2. The rotation device of claim 1, further comprising:
   said clutch gear (400) of the lower clutch sleeve (4) comprises an inclined surface, and said clutch gear (501) of the rotary handle sleeve (5) comprises an inclined surface.

3. The rotation device of claim 1, further comprising:
   a reset spring (12) disposed between said retaining ring (7) and said upper clutch sleeve (3).

4. A rotation device to adjust an angle of rotation of a canopy of a sunshade, comprising:
   an upper clutch sleeve (3) sleeved at a lower end of an upper tube (1) of the sunshade;
   a lower clutch sleeve (4) sleeved at an upper end of a lower tube (2) of the sunshade;
   a rotary handle sleeve (5) connected to said upper clutch sleeve and said lower clutch sleeve;
   a rotary shaft (6), wherein said rotary shaft (6) is rotationally inserted within one of the upper tube (1) and the lower tube (2) of the sunshade and fixedly connected with the other;
   a retaining ring (7) disposed between an upper end of the rotary handle sleeve (5) and the upper tube (1) of the sunshade;
   said retaining ring (7) elastically connected to one of the upper clutch sleeve (4) and the upper tube (1) of the sunshade;
   said upper clutch sleeve (3) comprising a set of guide ribs (300) disposed on an outer wall of the upper clutch sleeve (3);
   said rotary handle sleeve (5) comprising a set of guide grooves (500) disposed on an inner wall of the rotary handle sleeve (5);
   said guide ribs (300) slideably connected to said guide grooves (500);
   said lower clutch sleeve (4) comprising a clutch gear (400);
   said rotary handle sleeve (5) comprising a clutch gear (501), wherein said clutch gear (501) of the rotary handle sleeve (5) engages the clutch gear (400) of the lower clutch sleeve (3);
   said rotary shaft (6) rotationally inserted into the upper tube (1) of the sunshade and fixedly connected to the lower tube (2) of the sunshade;
   an upper fixing sleeve (8) disposed between the rotary shaft (6) and the upper tube (1) of the sunshade, wherein the upper fixing sleeve (8) is fixedly connected with one of the rotary shaft (6) and the upper tube (2) of the sunshade and is rotationally connected with the other;
   said upper fixing sleeve (8) fixedly connected to the upper clutch sleeve (3) and the upper tube (1) of the sunshade;

a set of shaft sleeves (9, 10) disposed between the upper fixing sleeve (8) and the rotary shaft (6);

an upper shaft sleeve (9) disposed between said upper fixing sleeve (8) and said rotary shaft (6), and a lower shaft sleeve (10) disposed between the upper fixing sleeve (8) and a lower end of the rotary shaft (6); and an upper end of the upper shaft sleeve (9) extending outwards to form a collar flange (900) of the upper shaft sleeve (9).

5. The rotation device of claim 4, further comprising:

said collar flange (900) of the upper shaft sleeve (9) clamped between a top of the upper fixing sleeve (8) and a snap ring (13) of the rotary shaft (6).

6. A rotation device to adjust an angle of rotation of a canopy of a sunshade, comprising:

an upper clutch sleeve (3) sleeved at a lower end of an upper tube (1) of the sunshade;

a lower clutch sleeve (4) sleeved at an upper end of a lower tube (2) of the sunshade;

a rotary handle sleeve (5) connected to said upper clutch sleeve and said lower clutch sleeve;

a rotary shaft (6), wherein said rotary shaft (6) is rotationally inserted within one of the upper tube (1) and the lower tube (2) of the sunshade and fixedly connected with the other;

a retaining ring (7) disposed between an upper end of the rotary handle sleeve (5) and the upper tube (1) of the sunshade;

said retaining ring (7) elastically connected to one of the upper clutch sleeve (4) and the upper tube (1) of the sunshade;

said upper clutch sleeve (3) comprising a set of guide ribs (300) disposed on an outer wall of the upper clutch sleeve (3);

said rotary handle sleeve (5) comprising a set of guide grooves (500) disposed on an inner wall of the rotary handle sleeve (5);

said guide ribs (300) are slideably connected to said guide grooves (500);

said lower clutch sleeve (4) comprising a clutch gear (400);

said rotary handle sleeve (5) comprising a clutch gear (501), wherein said clutch gear (501) of the rotary handle sleeve (5) engages the clutch gear (400) of the lower clutch sleeve (3);

said rotary shaft (6) rotationally inserted into the upper tube (1) of the sunshade and fixedly connected to the lower tube (2) of the sunshade;

an upper fixing sleeve (8) disposed between the rotary shaft (6) and the upper tube (1) of the sunshade, wherein the upper fixing sleeve (8) is fixedly connected with one of the rotary shaft (6) and the upper tube (2) of the sunshade and is rotationally connected with the other;

said upper fixing sleeve (8) fixedly connected to the upper clutch sleeve (3) and the upper tube (1) of the sunshade;

a set of shaft sleeves (9, 10) disposed between the upper fixing sleeve (8) and the rotary shaft (6);

an upper shaft sleeve (9) disposed between said upper fixing sleeve (8) and said rotary shaft (6), and a lower shaft sleeve (10) disposed between the upper fixing sleeve (8) and a lower end of the rotary shaft (6);

said lower tube (2) of the sunshade inserted into a lower part of said rotary shaft (6), wherein a lower fixing sleeve (11) is disposed to fixedly connect said lower tube (2) of the sunshade and said lower part of said rotary shaft (6); and said lower end of the lower shaft sleeve (10) extending outwards to form a collar flange (1000) of the lower shaft sleeve (10).

7. The rotation device of claim 6, further comprising:

said collar flange (1000) of the lower shaft sleeve (10) clamped between a bottom of the upper fixing sleeve (8) and a top of the lower fixing sleeve (11).

* * * * *